May 12, 1959
C. C. DAVIS
2,886,652
MAGNETIC HEAD WITH ADJUSTABLE SHIELD
FOR CONTROLLING STRAY MAGNETIC FLUX
Filed Nov. 28, 1956
FIG. 2
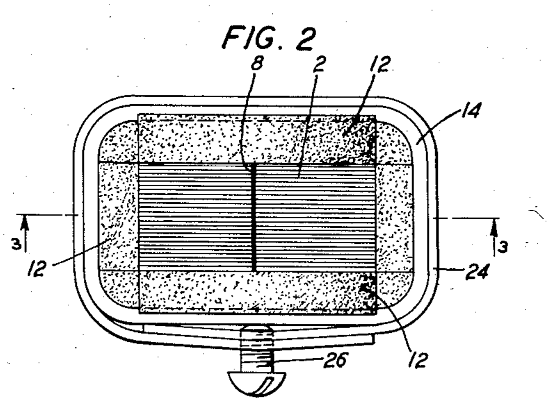
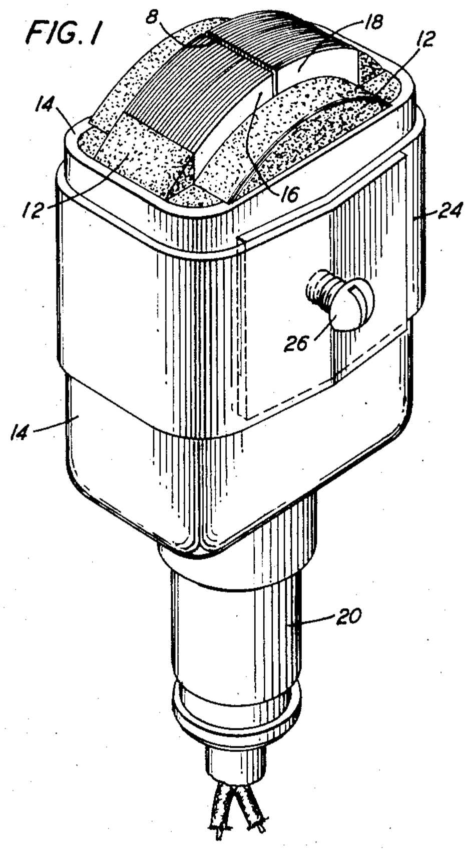
FIG. 3
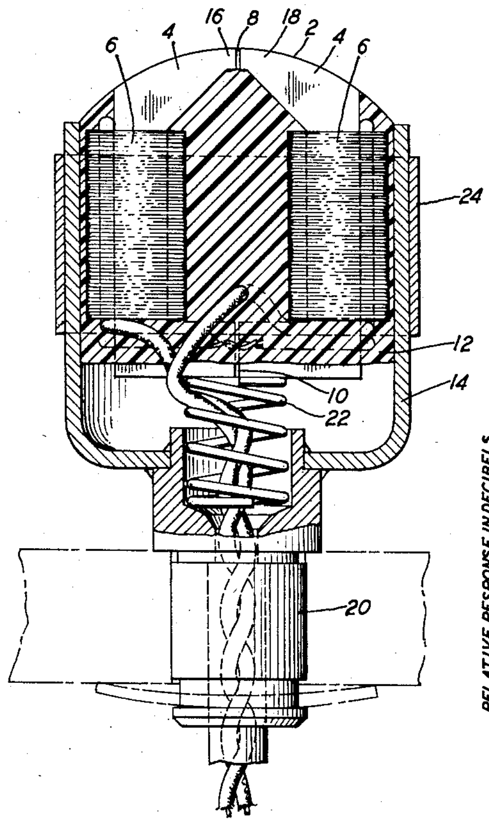
FIG. 4
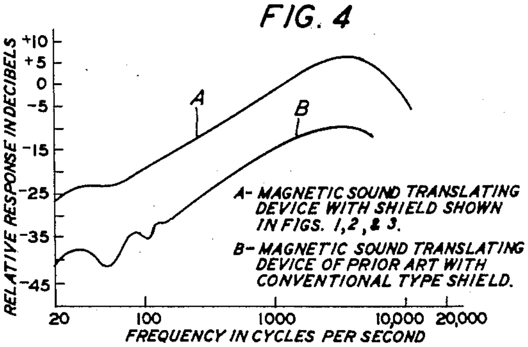
INVENTOR
C. C. DAVIS
BY
V. P. Priolo
ATTORNEY United States Patent Office 2,886,652

Patented May 12, 1959

2,886,652

MAGNETIC HEAD WITH ADJUSTABLE SHIELD FOR CONTROLLING STRAY MAGNETIC FLUX

Charles C. Davis, Los Angeles, Calif., assignor to Westrex Corporation, New York, N.Y., a corporation of Delaware Application November 28, 1956, Serial No. 624,915

7 Claims. (Cl. 179—100.2)

This invention relates to magnetic sound translating devices, and more particularly to magnetic sound translating devices which include means for preventing stray magnetic flux from adversely affecting their operation.

In a magnetic sound translating system the magnetic head may be located adjacent a motor, power transformer or other electrical component which will produce a magnetic field during operation. The stray alternating magnetic field produced by such a component may introduce a hum into the sound translating system which will interfere with the signals to be recorded or reproduced.

The prior art teaches a number of methods for overcoming this difficulty. For example, the magnetic head may be provided with a magnetic shield in the form of an external case, or it may be oriented with respect to the stray magnetic field until the hum is at a minimum. Also, optimum hum rejection may be obtained with double-coil ring-type magnetic heads without external shielding by balancing the relative sizes of their front and rear gaps. The hum rejection thus obtained is at least 30 decibels reduced from that of a comparable single coil head. If the magnetic head is completely symmetrical with regard to coils and laminations, maximum hum rejection is obtained with equal values of reluctance in the two gaps. Any deviation from symmetry may be compensated by adjustment of the gap ratio if the lamination stacks and coils are similar. However, when wear increases the reluctance of the front or pole gap a new ratio becomes necessary for optimum rejection, and this change cannot normally be accomplished.

Generally, the hum neutralizing arrangements taught in the prior art are costly, require impractical complicated constructions or are not sufficiently effective for commercial application.

It is an object of this invention to provide an improved, efficient and practical means for preventing stray magnetic disturbances from adversely affecting the recording or reproduction of sound in magnetic sound translating devices.

A further object is to improve the fidelity of magnetic sound reproducing devices by controlling stray magnetic flux and preventing it from adversely affecting the operation of said devices.

In accordance with the invention the magnetic head of the translating device is disposed in an outer case of nonmagnetic material and a shield comprising a substantially closed band of low reluctance magnetic material is disposed around said outer case, said shield being movable along the outer case and including means for locking it in the optimum position. This arrangement permits readjustment of the head to optimum hum rejection over a wide range of gap ratios or changes therein. It also permits some relaxing of tolerances in manufacture and largely avoids the introduction of bumps in the low-frequency response which are caused by the usual types of case shielding.

The nature of this invention and its distinguishing features and advantages will be more clearly understood from the following detailed description and the accompanying drawings in which:

Fig. 1 is a view in perspective of an embodiment of the invention;

Fig. 2 is a top view of the embodiment shown in Fig. 1;

Fig. 3 is a sectional view taken on the line 3—3 of Fig. 2; and

Fig. 4 is a diagram showing the frequency characteristic of the embodiment shown in Figs. 1, 2 and 3 and of a magnetic sound translating device produced in accordance with the teachings of the prior art.

Referring now to the accompanying drawings, the magnetic head 2 comprises two core and coil assemblies each of which includes the laminated magnetic core 4 and the coil 6. The assemblies are aligned with pole and back gap spacers 8 and 10 respectively therebetween, and, after encapsulation with potting material 12, are disposed in a nonmagnetic case 14 made of a material such as brass. All of magnetic head 2, except the arcuate portions of core 4 which terminate in pole tips 16 and 18, is disposed within case 14.

Joined to case 14, preferably by brazing, is mounting stud 20 which may also be made of a material such as brass. Disposed in stud 20, in such manner as to make good electrical contact with the laminated cores of magnetic head 2 and stud 20, is the grounding spring 22. The material preferred for spring 22 is beryllium copper.

The adjustable shield 24, made of a material having high magnetic permeability, such as mu-metal, is in the form of a closed band which may be moved lengthwise with respect to the nonmagnetic outer case 14. The width of shield 24 is determined largely by the lamination dimension (in the same direction). The shield is made as wide as possible to obtain a reasonable amount of shielding, but narrow enough so its balanced position will not cause it to lie too close to the record medium. The width of the shield is somewhat less than the corresponding lamination dimension. The shield is locked in position by tightening screw 26 against case 14. The locking position is the position in which maximum neutralization of the stray magnetic flux is achieved and the magnitude of hum pickup is reduced to a minimum. The stray magnetic lines of flux in the region of magnetic head 2 will induce a voltage in the inductive windings or coils 6. This induced voltage is compensated for when shield 24 is properly oriented with respect to head 2. The presence of shield 24 in the stray magnetic field will set up an opposing magnetic field. This opposite field will cause a voltage to be induced in coils 6 of opposite polarity to the voltage induced directly in coils 6 by the stray magnetic lines of flux. Shield 24 is capable of producing an opposing magnetic field which will induce the required voltage necessary to oppose and effectively cancel or neutralize the voltage induced directly by the stray magnetic field.

With the conventional types of case shielding, wherein the rear gap of the head is disposed within the case or shield the shield must be carried close to the front gap in order to provide maximum shielding against hum. Since this results in secondary poles coupled closely to the record medium and laminations, low frequency bumps result. With the present invention the edges of the shield generally lie farther from the record medium and therefore create a minimum of low frequency bumps.

In Fig. 4 are shown the frequency characteristic of a sound translating device made in accordance with the present invention and of a commercially available magnetic sound translating device made in accordance with the teachings of the prior art. It will be readily seen that the present invention affords an overall improvement in response and a particular improvement in the lower frequencies where the response is relatively free from low end "bumps" caused by conventional types of case shielding.

It is to be understood that the above-described arrangements are illustrative of the application of the principles of the invention. Other arrangements may be devised by those skilled in the art without departing from the spirit and scope of the invention.

What is claimed is:

1. A magnetic sound translating device comprising a magnetic head the operation of which may be adversely affected by a stray alternating magnetic field, an outer case of nonmagnetic material within which said head is disposed, and a substantially closed band of magnetic material disposed around said outer case, said band being movable along said outer case to an optimum position whereat maximum neutralization of the effect of said stray field is achieved, the dimension of said band in the direction of movement being smaller than the corresponding dimension of said head.

2. A magnetic sound translating device in accordance with claim 1 including means for locking said band in said optimum position.

3. A magnetic sound translating device comprising a magnetic head the operation of which may be adversely affected by a stray alternating magnetic field, an outer case of nonmagnetic material within which said head is disposed, and a substantially closed band of magnetic material disposed around said outer case, said band being movable lengthwise with respect to said outer case to a position whereat said band will be energized by said stray field and magnetically coupled to said head in such manner as to substantially neutralize the effect on said head by said stray field, the dimension of said band in the direction of movement being smaller than the corresponding dimension of said head.

4. A magnetic sound translating device comprising a magnetic head encapsulated with potting material and then disposed in an outer case of nonmagnetic material, and a shield for neutralizing the effect of stray magnetic fields, said shield comprising a substantially closed band of magnetic material disposed in such manner as to encircle said outer case, said shield being movable along said case to an optimum position whereat maximum neutralization of the effect of said stray field is achieved, the dimension of said shield in the direction of movement being smaller than the corresponding dimension of said head.

5. A magnetic sound translating device in accordance with claim 4 including means for locking said shield in said optimum position.

6. In a magnetic sound translating device, a double-coil ring-type magnetic head comprising a pair of pole-pieces having arcuate portions the tips of which are separated to form a gap, an outer case of nonmagnetic material within which all of said head except said arcuate portions of said pole-pieces is disposed, and a shield comprising a substantially closed band of magnetic material disposed in such manner as to encircle said case, said shield being movable along said case to an optimum position whereat maximum neutralization of the effect of stray alternating magnetic fields is achieved, the dimension of said shield in the direction of movement being smaller than the corresponding dimension of said head.

7. A magnetic sound translating device in accordance with claim 6 including means for locking said shield in said optimum position.

References Cited in the file of this patent

UNITED STATES PATENTS

| | | |
|---|---|---|
| 2,560,430 | Friend | July 10, 1951 |
| 2,628,286 | Rettinger | Feb. 10, 1953 |

FOREIGN PATENTS

| | | |
|---|---|---|
| 204,862 | Australia | June 16, 1955 |